United States Patent
Shimizu et al.

(10) Patent No.: US 12,473,591 B2
(45) Date of Patent: Nov. 18, 2025

(54) METHOD FOR DETECTING MICROORGANISMS

(71) Applicants: National University Corporation Tokyo Medical and Dental University, Tokyo (JP); Nihon Techno Service Co., Ltd., Ibaraki (JP); National University Corporation Oita University, Oita (JP); Riken, Saitama (JP); Shimadzu Corporation, Kyoto (JP)

(72) Inventors: Norio Shimizu, Tokyo (JP); Hiroshi Takase, Tokyo (JP); Manabu Mochizuki, Tokyo (JP); Yasuhiro Tomaru, Ibaraki (JP); Satoko Nakano, Oita (JP); Sunao Sugita, Saitama (JP); Masamitsu Shikata, Kyoto (JP)

(73) Assignees: National University Corp. Tokyo Medical and Dental University, Tokyo (JP); Nihon Techno Service Co., Ltd., Ibaraki (JP); National University Corp. Oita University, Oita (JP); Riken, Saitama (JP); Shimadzu Corporation, Kyoto (JP)

( * ) Notice: Subject to any disclaimer, the term of this patent is extended or adjusted under 35 U.S.C. 154(b) by 0 days.

(21) Appl. No.: 17/687,490

(22) Filed: Mar. 4, 2022

(65) Prior Publication Data

US 2022/0235398 A1    Jul. 28, 2022

Related U.S. Application Data

(62) Division of application No. 16/893,356, filed on Jun. 4, 2020, now abandoned.

(51) Int. Cl.
| | | |
|---|---|---|
| C12Q 1/686 | (2018.01) | |
| C12Q 1/32 | (2006.01) | |
| C12Q 1/6806 | (2018.01) | |
| C12Q 1/6816 | (2018.01) | |
| C12Q 1/689 | (2018.01) | |
| C12Q 1/6893 | (2018.01) | |
| C12Q 1/70 | (2006.01) | |
| G01N 21/64 | (2006.01) | |

(52) U.S. Cl.
CPC ............ *C12Q 1/686* (2013.01); *C12Q 1/32* (2013.01); *C12Q 1/6806* (2013.01); *C12Q 1/6816* (2013.01); *C12Q 1/689* (2013.01); *C12Q 1/6893* (2013.01); *C12Q 1/702* (2013.01); *C12Q 1/705* (2013.01); *G01N 21/6486* (2013.01)

(58) Field of Classification Search
CPC .... C12Q 1/701; C12Q 1/6806; C12Q 1/6816; C12Q 1/686; C12Q 1/689; C12Q 1/6893; C12Q 1/702; C12Q 1/705; G01N 21/6486
See application file for complete search history.

(56) References Cited

U.S. PATENT DOCUMENTS

| | | |
|---|---|---|
| 2010/0209973 A1 | 8/2010 | Kim et al. |
| 2017/0275684 A1 | 9/2017 | Zheng |

FOREIGN PATENT DOCUMENTS

| | | | |
|---|---|---|---|
| JP | 2009538146 A | 11/2009 | |
| JP | 2014522646 A | 9/2014 | |
| WO | WO-2010083464 A2 * | 7/2010 | ........... C12Q 1/6883 |
| WO | 2016059798 | 3/2018 | |

OTHER PUBLICATIONS

Sugita et al., "Use of multiplex PCR and real-time PCR to detect human herpes virus genome in ocular fluids of patients with uveitis," Br. J. Ophthalmol., vol. 92, pp. 928-932. (Year: 2008).*
Lee et al., "Rapid detection of pathogenic leptospires by lyophilized reagent-based Polymerase Chain Reaction," Tropical Biomedicine, vol. 28, No. 3, pp. 497-505. (Year: 2011).*
Sekikawa et al., "A new method for efficient detection of Cryptosporidium RNA by real-time reverse transcription-PCR with surfactants," Water Science & Technology: Water Supply, vol. 15.5, pp. 1061-1068. (Year: 2015).*
Higgins et al., "A Field Investigation of Bacillus anthracis Contamination of U.S. Department of Agriculture and Other Washington, D.C., Buildings during the Anthrax Attack of Oct. 2001," Applied and Environmental Microbiology, January, vol. 69, No. 1, pp. 593-599. (Year: 2003).*
Vendenbussche et al., "Simultaneous Detection of Bluetongue Virus RNA, Internal Control GAPDH mRNA, and External Control Synthetic RNA by Multiplex Real-Time PCR," RT-PCR Protocols: Second edition, Methods in Molecular Biology, vol. 630, Chapter 7 , pp. 97-108. (Year: 2010).*
TaKaRa Ex Taq Product Description [retrieved on-line, retrieved from: http://www.takara.co.kr/file/manual/pdf/hrr001a_ds.v1102da. pdf, retrieval date May 1, 2023. (Year: 2023).*
Tjhie et al., "Direct PCR Enables Detection of Mycoplasma pneumoniae in Patients with Respiratory Tract Infections," Journal of Clinical Microbiology, January, vol. 32, No. 1, pp. 11-16. (Year: 1994).*
Yoshikado, Saori, Office Action, Japan Patent Office, Application No. 2019-107483, Apr. 11, 2023.
Arunrut et al., "Multiplex PCR assay and lyophilization for detection of *Salmonella* spp., *Staphylococcus aureus* and *Bacillus cereus* in pork products", Food Sci. Biotechnol., Jan. 25, 2018, vol. 27, No. 3, pp. 867-875.

(Continued)

*Primary Examiner* — Young J Kim
(74) *Attorney, Agent, or Firm* — Gavrilovich, Dodd & Lindsey LLP

(57) ABSTRACT

The present invention relates to a method for simultaneously detecting a plurality of pathogens from biologically-derived samples, and a kit for carrying out the method. Specifically, the present invention relates to a method for simultaneously detecting a plurality of pathogens that cause infectious uveitis, one of eye infections from samples such as anterior chamber fluid or vitreous by polymerase chain reaction (PCR), and a kit for carrying out the method.

8 Claims, 5 Drawing Sheets

Specification includes a Sequence Listing.

(56) References Cited

OTHER PUBLICATIONS

Nakano et al., "Comprehensive polymerase chain reaction system for diagnosis of ocular infectious diseases", Ophthalmology, 2017, vol. 59, No. 12, pp. 1479-1484.

Nakano et al., "Establishment of Multiplex Solid-Phase Strip PCR Test for Detection of 24 Ocular Infectious Disease Pathogens", Immunology and Microbiology, Mar. 2017, vol. 58, No. 3, pp. 15530-1559.

Yoshikado, Saori, Office Action, Japan Patent Office, Application No. 2019-107483, Sep. 26, 2022.

Zhang, et al., "Direct DNA Amplification from Crude Clinical Samples Using a PCR Enhancer Cocktail and Novel Mutants of Taq", Journal of Molecular Diagnostics, Mar. 2010, vol. 12, No. 2, pp. 152-161.

Dailey, Wendy et al., "Norrin induces expression of genes characteristic of the BRB in primary human Retinal Endothelial Cells", Investigative Ophthalmology & Visual Science, Jun. 2017, vol. 58, 1553.

Date, Rina, Office Action, Application No. 2023-117029, Japan Patent Office, Sep. 24, 2024.

Date, Rina, Office Action, Japan Patent Office, Application No. 2023-117029, Apr. 1, 2025.

\* cited by examiner

FIG. 1A

| No. | Sample | Pathogen | Tube strips (Cq value) | Quantitative PCR (copy/mL) |
|---|---|---|---|---|
| 1 | Anterior chamber fluid | HSV-1 | 29.81 | $1.39 \times 10^6$ |
| 2 | Anterior chamber fluid | HSV-1 | 30.05 | $2.48 \times 10^4$ |
| 3 | Anterior chamber fluid | HSV-1 | 32.32 | $4.82 \times 10^3$ |
| 4 | Anterior chamber fluid | HSV-1 | 33.06 | $2.71 \times 10^3$ |
| 5 | Anterior chamber fluid | HSV-1 | 33.32 | $2.55 \times 10^5$ |
| 6 | Anterior chamber fluid | HSV-1 | 35.01 | $9.10 \times 10^3$ |
| 7 | Anterior chamber fluid | HSV-1 | 35.69 | $2.31 \times 10^3$ |
| 8 | Anterior chamber fluid | HSV-1 | 36.13 | $2.63 \times 10^4$ |
| 9 | Anterior chamber fluid | HSV-1 | 36.19 | $4.29 \times 10^4$ |
| 10 | Anterior chamber fluid | HSV-1 | 36.31 | $1.79 \times 10^3$ |
| 11 | Anterior chamber fluid | HSV-1 | 36.83 | $4.70 \times 10^4$ |
| 12 | Anterior chamber fluid | HSV-2 | 30.53 | $6.38 \times 10^3$ |
| 13 | Anterior chamber fluid | HSV-2 | 31.74 | $5.32 \times 10^4$ |
| 14 | Anterior chamber fluid | HSV-2 | 32.07 | $7.61 \times 10^3$ |
| 15 | Anterior chamber fluid | VZV | 18.79 | $2.04 \times 10^7$ |
| 16 | Anterior chamber fluid | VZV | 20.91 | $1.72 \times 10^7$ |
| 17 | Anterior chamber fluid | VZV | 21.87 | $4.60 \times 10^6$ |
| 18 | Anterior chamber fluid | VZV | 24.36 | $4.90 \times 10^6$ |
| 19 | Anterior chamber fluid | VZV | 26.84 | $5.14 \times 10^6$ |
| 20 | Anterior chamber fluid | VZV | 27.38 | $5.33 \times 10^4$ |

FIG. 1B

| 21 | Anterior chamber fluid | VZV | 2539 | $1.25 \times 10^5$ |
|---|---|---|---|---|
| 22 | Anterior chamber fluid | VZV | 29.99 | $5.15 \times 10^3$ |
| 23 | Anterior chamber fluid | VZV | 30.48 | $4.89 \times 10^4$ |
| 24 | Anterior chamber fluid | VZV | 31.20 | $1.60 \times 10^4$ |
| 25 | Anterior chamber fluid | VZV | 32.51 | $4.73 \times 10^4$ |
| 26 | Anterior chamber fluid | VZV | 35.89 | $3.84 \times 10^3$ |
| 27 | Anterior chamber fluid | EBV | 24.24 | $4.59 \times 10^5$ |
| 28 | Anterior chamber fluid | EBV | 26.09 | $3.30 \times 10^6$ |
| 29 | Anterior chamber fluid | EBV | 29.56 | $2.33 \times 10^5$ |
| 30 | Anterior chamber fluid | EBV | 30.86 | $3.47 \times 10^5$ |
| 31 | Anterior chamber fluid | CMV | 29.19 | $2.34 \times 10^5$ |
| 32 | Anterior chamber fluid | CMV | 29.29 | $3.69 \times 10^5$ |
| 33 | Anterior chamber fluid | CMV | 30.71 | $1.12 \times 10^5$ |
| 34 | Anterior chamber fluid | CMV | 31.42 | $3.24 \times 10^4$ |
| 35 | Anterior chamber fluid | CMV | 31.49 | $1.55 \times 10^4$ |
| 36 | Vitreous | CMV | 33.40 | $2.16 \times 10^5$ |
| 37 | Anterior chamber fluid | CMV | 33.57 | $4.73 \times 10^4$ |
| 38 | Anterior chamber fluid | CMV | 36.54 | $2.38 \times 10^3$ |
| 39 | Anterior chamber fluid | CMV | 37.51 | $1.58 \times 10^3$ |
| 40 | Anterior chamber fluid | HHV-6 | 36.27 | $7.45 \times 10^2$ |
| 41 | Anterior chamber fluid | HHV-6 | 38.81 | $4.43 \times 10^3$ |
| 42 | Vitreous | HTLV-1 | 31.99 | $1.00 \times 10^4$ |
| 43 | Vitreous | HTLV-1 | 33.45 | $3.02 \times 10^4$ |

FIG. 1C

| 44 | Vitreous | HTLV-1 | 33.64 | $2.60 \times 10^4$ |
|---|---|---|---|---|
| 45 | Anterior chamber fluid | HTLV-1 | 34.55 | $1.00 \times 10^5$ |
| 46 | Anterior chamber fluid | HTLV-1 | 35.34 | $1.13 \times 10^5$ |
| 47 | Anterior chamber fluid | HTLV-1 | 36.56 | $9.33 \times 10^3$ |
| 48 | Anterior chamber fluid | HTLV-1 | 38.51 | $6.83 \times 10^3$ |
| 49 | Anterior chamber fluid | HTLV-1 | 38.66 | $8.50 \times 10^2$ |
| 50 | Anterior chamber fluid | HTLV-1 | 3532 | $4.75 \times 10^3$ |
| 51 | Anterior chamber fluid | Treponema pallidum | 27.93 | $2.34 \times 10^4$ |
| 52 | Anterior chamber fluid | Toxoplasma | 30.02 | $8.39 \times 10^4$ |
| 53 | Anterior chamber fluid | Toxoplasma | 31.48 | $6.12 \times 10^5$ |

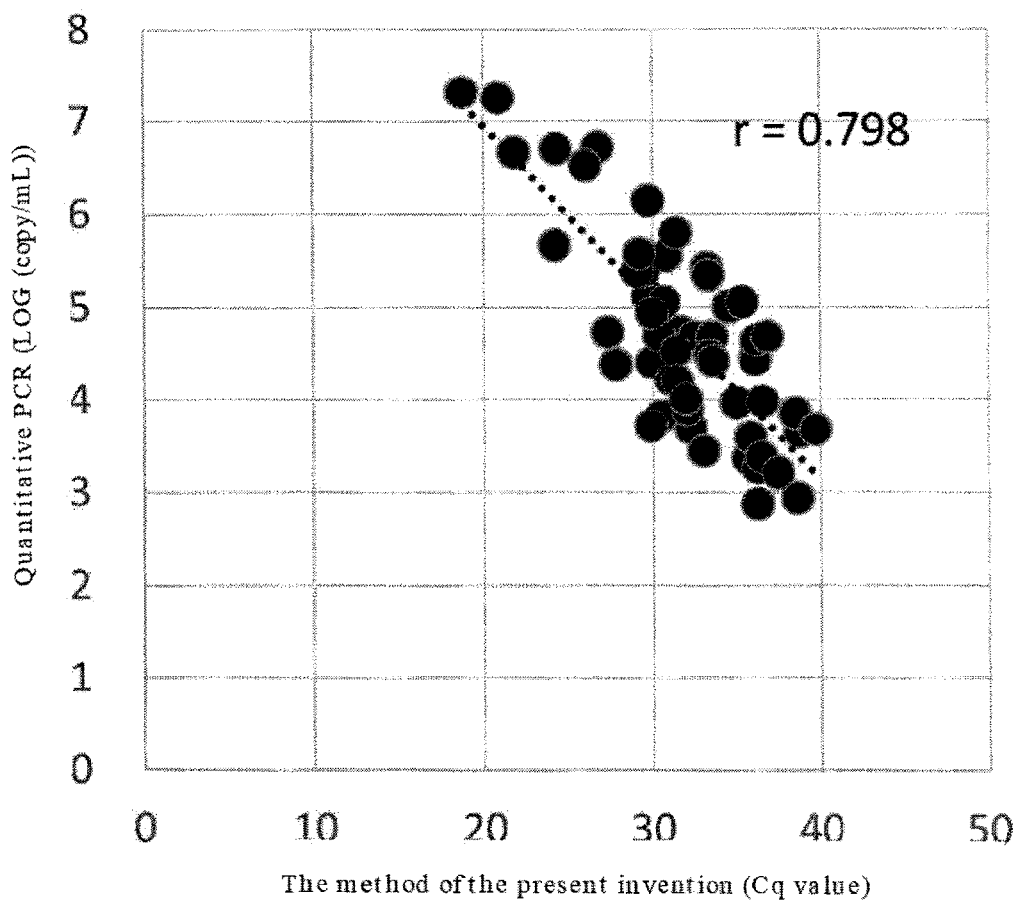

| No. | Sample | Tube strips (Cq value) | Quantitative PCR (copy/mL) |
|---|---|---|---|
| 1 | Anterior chamber fluid | Not detected | Not detected |
| 2 | Anterior chamber fluid | Not detected | Not detected |
| 3 | Anterior chamber fluid | Not detected | Not detected |
| 4 | Anterior chamber fluid | Not detected | Not detected |
| 5 | Anterior chamber fluid | Not detected | Not detected |
| 6 | Anterior chamber fluid | Not detected | Not detected |
| 7 | Anterior chamber fluid | Not detected | Not detected |
| 8 | Anterior chamber fluid | Not detected | Not detected |
| 9 | Anterior chamber fluid | Not detected | Not detected |
| 10 | Anterior chamber fluid | Not detected | Not detected |
| 11 | Anterior chamber fluid | Not detected | Not detected |
| 12 | Anterior chamber fluid | Not detected | Not detected |
| 13 | Anterior chamber fluid | Not detected | Not detected |
| 14 | Anterior chamber fluid | Not detected | Not detected |
| 15 | Anterior chamber fluid | Not detected | Not detected |
| 16 | Anterior chamber fluid | Not detected | Not detected |
| 17 | Anterior chamber fluid | Not detected | Not detected |
| 18 | Anterior chamber fluid | Not detected | Not detected |
| 19 | Anterior chamber fluid | Not detected | Not detected |
| 20 | Anterior chamber fluid | Not detected | Not detected |
| 21 | Anterior chamber fluid | Not detected | Not detected |
| 22 | Anterior chamber fluid | Not detected | Not detected |
| 23 | Anterior chamber fluid | Not detected | Not detected |
| 24 | Anterior chamber fluid | Not detected | Not detected |
| 25 | Anterior chamber fluid | Not detected | Not detected |
| 26 | Anterior chamber fluid | Not detected | Not detected |
| 27 | Anterior chamber fluid | Not detected | Not detected |
| 28 | Anterior chamber fluid | Not detected | Not detected |
| 29 | Anterior chamber fluid | Not detected | Not detected |
| 30 | Anterior chamber fluid | Not detected | Not detected |
| 31 | Anterior chamber fluid | Not detected | Not detected |
| 32 | Anterior chamber fluid | Not detected | Not detected |
| 33 | Anterior chamber fluid | Not detected | Not detected |

FIG. 3A (continued)

| 34 | Anterior chamber fluid | Not detected | Not detected |
|---|---|---|---|
| 35 | Anterior chamber fluid | Not detected | Not detected |
| 36 | Anterior chamber fluid | Not detected | Not detected |
| 37 | Anterior chamber fluid | Not detected | Not detected |
| 38 | Anterior chamber fluid | Not detected | Not detected |
| 39 | Anterior chamber fluid | Not detected | Not detected |
| 40 | Anterior chamber fluid | Not detected | Not detected |
| 41 | Anterior chamber fluid | Not detected | Not detected |
| 42 | Anterior chamber fluid | Not detected | Not detected |
| 43 | Anterior chamber fluid | Not detected | Not detected |
| 44 | Anterior chamber fluid | Not detected | Not detected |
| 45 | Anterior chamber fluid | Not detected | Not detected |

FIG. 3B

| 46 | Anterior chamber fluid | Not detected | Not detected |
|---|---|---|---|
| 47 | Anterior chamber fluid | Not detected | Not detected |
| 48 | Vitreous | Not detected | Not detected |
| 49 | Vitreous | Not detected | Not detected |
| 50 | Vitreous | Not detected | Not detected |
| 51 | Vitreous | Not detected | Not detected |

METHOD FOR DETECTING MICROORGANISMS

CROSS REFERENCE TO RELATED APPLICATIONS

This application is a divisional of U.S. application Ser. No. 16/893,356, filed Jun. 4, 2020, which claims priority under 35 U.S.C. § 119 to Japanese Application No. JP2019-107483, filed Jun. 7, 2019, the disclosures of which are incorporated herein by reference.

TECHNICAL FIELD

The present invention relates to a method for simultaneously detecting a plurality of infectious microorganisms from biologically-derived samples, and a kit for carrying out the method. Specifically, the present invention relates to a method for simultaneously detecting a plurality of pathogens that cause infectious uveitis, one of eye infections from samples such as anterior chamber fluid or vitreous by polymerase chain reaction (PCR), and a reagent kit for carrying out the method.

BACKGROUND TECHNOLOGY

Uveitis is a general term for diseases that cause inflammation in the eye. In severe cases, it causes visual disorders such as blindness at a high rate. Uveitis is classified into non-infectious uveitis such as sarcoidosis, Harada disease and Behcet's disease, and infectious uveitis caused by a pathogen. The non-infectious uveitis is treated with an immunosuppressive drug such as a steroid drug. On the other hand, the infectious uveitis requires treatment with a drug corresponding to the causative pathogen. However, the distinction between infectious uveitis and non-infectious uveitis may be difficult only by clinical findings, and there are cases where the symptoms become serious due to delay of diagnosis or improper treatment. Accordingly, early identification of presence and type of pathogens in uveitis is important for the selection of appropriate treatment methods and prevention of serious symptoms.

Pathogens that cause infectious uveitis include viruses, bacteria, fungi, protozoa, etc., among which infectious uveitis caused by viruses has the highest incidence. The causative viruses include herpes simplex virus (HSV) type 1 and 2, varicella zoster virus (VZV), cytomegalovirus (CMV) and other herpesviruses, and human adult T cell leukemia virus (HTLV-1), and the like. Identification of an infectious agent is important information in diagnosing and treating infectious uveitis. Therefore, in order to identify the infectious virus locally in the eye, it is necessary to use the anterior chamber fluid collected from the anterior chamber or the vitreous collected from the eye as a sample.

The anterior chamber is a space between the cornea and the crystalline lens. The anterior chamber fluid that fills the space is used as a sample for genetic testing by PCR for the identification of pathogens. However, the collected amount of the anterior chamber fluid is usually 100 μL or less. The amount of sample may be insufficient to detect a plurality of pathogens.

SUMMARY OF THE INVENTION

Problems to be Solved by the Invention

The reason for the shortage of the above-mentioned sample is that when a nucleic acid to be subjected to PCR is extracted from the sample, a certain amount of sample is generally lost in the extraction operation step. In particular, when nucleic acid is extracted from a small amount of sample, it may not be possible to secure a sufficient amount of sample to be subjected to PCR due to loss of the sample in the extraction operation step. Furthermore, in infectious uveitis, the causative pathogens are major ones, including the following 9 types: herpes simplex virus type 1 (HSV-1) and type 2 (HSV-2), varicella zoster virus (VZV), Epstein-Barr virus (EBV), human herpesvirus type 6 (HHV-6), cytomegalovirus (CMV), human adult T-cell leukemia virus (HTLV-1), bacterium Treponema pallidum and toxoplasma which is a protozoa. A certain amount of sample is required to detect all of these items, but only a small amount of anterior chamber fluid can be collected. In addition, in order to detect each pathogen individually, it is necessary to prepare PCR reagents and PCR primers for each pathogen. However, if the number of detection targets increases, there is a high possibility that human error such as incorrect insertion of a reagent will occur, and there is a risk of giving an erroneous detection result.

An object of the present invention is to provide a detection method capable of simultaneously and rapidly detecting a plurality of pathogens even with a small amount of sample, and a kit for carrying out the method. A further object of the present invention is to provide a detection method that can avoid human error in the pathogen detection operation by employing a simple detection step, and a kit for carrying out the method.

Means for Solving the Problem

That is, the object of the present invention is achieved by the following inventions.

[1] A method for detecting microorganisms in a sample, comprising
(1) a step of mixing the sample with a PCR buffer containing a surfactant;
(2) a step of adding a part of the mixed solution obtained in the step (1) to a tube containing a solid composition for PCR reaction, which is a tube strip formed by connecting a plurality of tubes, and each tube contains DNA polymerase and one or more types of PCR primer pairs; and
(3) a step of detecting the PCR product generated in the tube.

[2] The method according to [1], wherein the sample is anterior chamber fluid or vitreous.

[3] The method according to [1] or [2], wherein the amount of the sample is 12-20 μL.

[4] The method according to any one of [1] to [3], wherein the microorganism is selected from the group consisting of herpes simplex virus type 1 (HSV-1) and type 2 (HSV-2), varicella zoster virus (VZV), Epstein-Barr virus (EBV), human herpesvirus type 6 (HHV-6), cytomegalovirus (CMV), human adult T-cell leukemia virus (HTLV-1), Treponema pallidum and toxoplasma.

[5] The method according to any one of [1] to [4], wherein in the step (1), the surfactant is a nonionic surfactant.

[6] The method according to any one of [1] to [5], wherein in the step (1), the PCR buffer is Tris buffer containing KCl, $MgCl_2$ and dNTP mix (a mixture of dATP, dGTP, dCTP and dTTP).

[7] The method according to any one of [1] to [6], wherein in the step (1), the PCR buffer binds to substances which are biologically-derived negatively charged substance that adsorbs to DNA polymerase and biologically-derived a positively-charged substance that adsorbs to DNA, and inhibit PCR and contains a substance that neutralizes the PCR inhibitory effect of the negatively charged substance and the positively charged substance.

[8] The method according to any one of [1] to [7], wherein in the step (2), the tube strip is 2-12 tube strips.

[9] The method according to any one of [1] to [8], wherein in the step (2), the PCR primer pairs are those for detecting herpes simplex virus type 1 (HSV-1) or type 2 (HSV-2), varicella zoster virus (VZV), Epstein-Barr virus (EBV), human herpesvirus type 6 (HHV-6), Cytomegalovirus (CMV), human adult T-cell leukemia virus (HTLV-1), Treponema pallidum or toxoplasma.

[10] The method according to any one of [1] to [9], wherein in the step (2), the two types of PCR primer pairs contained in each tube are the following combinations.
   (i) Glyceraldehyde-3-phosphate dehydrogenase (GAPDH) gene detection primer pair and TATA-binding protein (TBP) gene detection primer pair
   (ii) HSV-1 detection primer pair and VZV detection primer pair
   (iii) HSV-2 detection primer pair and HHV-6 detection primer pair
   (iv) EBV detection primer pair and CMV detection primer pair
   (v) HTLV-1 detection primer pair and Treponema pallidum detection primer pair

[11] The method according to any one of [1] to [10], wherein in the step (2), the solid composition for PCR reaction contains an oligonucleotide probe labeled with one or more types of fluorescent dyes for fluorescent detection of PCR amplification products.

[12] The method according to [11], wherein the fluorescent dyes are selected from the group consisting of FAM (6-carboxyfluorescein), ROX (6-carboxy-X-rhodamine), Cy5 (Cyanine dye) and HEX (4,7,2',4',5',7'-hexachlorofluor-6-carboxyfluorescein).

[13] The method according to any one of [1] to [12], wherein in the step (2), the solid composition for PCR reaction is prepared by lyophilization.

[14] The method according to any one of [1] to [13], wherein in the step (3), the PCR products are detected by real-time determination.

[15] A kit for detecting microorganisms in a sample, equipped with tube 1 which contains a PCR buffer containing a surfactant for mixing the sample, and tube 2 which contains solid composition for PCR reaction which is a tube strip formed by connecting a plurality of tubes, and each tube contains DNA polymerase and one or more types of PCR primer pairs for adding a part of the mixed solution contained in tube 1.

[16] The kit according to [15], wherein the surfactant is a nonionic surfactant.

[17] The kit according to [15] or [16], wherein the PCR buffer is Tris buffer containing KCl, MgCl$_2$ and dNTP mix (mixture consisting of dATP, dGTP, dCTP and dTTP).

[18] The kit according to any one of [15] to [17], wherein the PCR buffer binds to substances which are biologically-derived negatively charged substance that adsorbs to DNA polymerase and biologically-derived a positively-charged substance that adsorbs to DNA, and inhibit PCR and contains a substance that neutralizes the PCR inhibitory effect of the negatively charged substance and the positively charged substance.

[19] The kit according to any one of [15] to [18], wherein the tube strip is 2-12 well strip tube.

[20] The kit according to any one of [15] to [19], wherein the PCR primer pairs are those for detecting herpes simplex virus type 1 (HSV-1) or type 2 (HSV-2), varicella zoster virus (VZV), Epstein-Barr virus (EBV), human herpesvirus type 6 (HHV-6), Cytomegalovirus (CMV), human adult T-cell leukemia virus (HTLV-1), Treponema pallidum or toxoplasma.

[21] The kit according to any one of [15] to [20], wherein the two types of PCR primer pairs contained in each tube are the following combinations.
   (i) Glyceraldehyde-3-phosphate dehydrogenase (GAPDH) gene detection primer pair and TATA-binding protein (TBP) gene detection primer pair
   (ii) HSV-1 detection primer pair and VZV detection primer pair
   (iii) HSV-2 detection primer pair and HHV-6 detection primer pair
   (iv) EBV detection primer pair and CMV detection primer pair
   (v) HTLV-1 detection primer pair and Treponema pallidum detection primer pair

[22] The kit according to any one of [15] to [21], wherein the solid composition for PCR reaction contains an oligonucleotide probe labeled with one or more types of fluorescent dyes for fluorescent detection of PCR amplification products.

[23] The kit according to [22], wherein the fluorescent dyes are selected from the group consisting of FAM (6-carboxyfluorescein), ROX (6-carboxy-X-rhodamine), Cy5 (Cyanine dye) and HEX (4,7,2',4',5',7'-hexachlorofluor-6-carboxyfluorescein).

[24] The kit according to any one of [15] to [23], wherein the solid composition for PCR reaction is prepared by lyophilization.

[25] A method for testing a gene, comprising
   (1) a step of mixing a sample and a PCR buffer containing a surfactant;
   (2) a step of adding a part of the mixed solution obtained in the above step (1) to a solid composition for PCR reaction which contains DNA polymerase and glyceraldehyde-3-phosphate dehydrogenase (GAPDH) detection primer pair and/or TATA-binding protein (TBP) detection primer pair;
   (3) a step of adding a part of the mixed solution obtained in the above step (1) to a solid composition for PCR reaction which contains DNA polymerase and one or more types of PCR primer pairs; and
   (4) a step of detecting the PCR products generated as results of the steps (2) and (3).

Effects of the Invention

According to the present invention, a step of extracting a nucleic acid from a sample (for example, an aqueous humor) is unnecessary, so that the sample is hardly lost in the step of detecting a microorganism. Therefore, it is possible to simultaneously and quickly detect a plurality of pathogenic microbes even with a small amount of sample. Furthermore, since the microorganism detecting step in the present invention is simple, it is possible to avoid human error in the detecting operation.

BRIEF DESCRIPTION OF THE DRAWINGS

FIG. 1A, FIG. 1B, and FIG. 1C show the analysis results of 53 samples of human anterior chamber fluid or vitreous suspected to have pathogens using the method and kit of the present invention and the quantitative (qPCR) method.

FIG. 2, FIG. 1A, FIG. 1B and FIG. 1C show the correlation between Cq values obtained using the method and kit of the present invention and quantitative values (copy/mL) obtained by the quantitative PCR (qPCR) method.

FIG. 3A and FIG. 3B show the analysis results of 51 samples of human anterior chamber fluid or vitreous diagnosed with non-infectious uveitis using the method and kit of the present invention and the quantitative PCR (qPCR) method.

EMBODIMENT FOR CARRYING OUT THE INVENTION

The present invention is a method for detecting microorganisms in a sample. The method comprises (1) a step of mixing the sample with a PCR buffer containing a surfactant; (2) a step of adding a part of the mixed solution obtained in the step (1) to a tube containing a solid composition for PCR reaction, which is a tube strip formed by connecting a plurality of tubes, and each tube contains DNA polymerase and one or more types of PCR primer pairs; and (3) a step of detecting the PCR product generated in the tube.

As the sample used in the method of the present invention, a solid substance obtained from eye tissue, a viscous substance or a liquid substance can be used. However, anterior chamber fluid or vitreous are preferably used for diagnosing pathogen infections in uveitis. The amount of anterior chamber fluid collected is generally about 50-100 µL. In the present invention, 12-20 anterior chamber fluid or vitreous can be used to detect microbial infection, but depending on the number of microorganisms to be measured, it can be detected even at less than 12 µL.

In the method of the present invention, pathogens to be detected include viruses, bacteria, fungi, protozoa and the like. Viruses include DNA viruses and RNA viruses. Examples of DNA viruses include, but are not limited to, herpes simplex virus type 1 (HSV-1) and type 2 (HSV-2), varicella zoster virus (VZV), Epstein-Barr virus (EBV), human herpesvirus type 6 (HHV-6), Cytomegalovirus (CMV), etc. Examples of RNA viruses include, but are not limited to, human adult T-cell leukemia virus (HTLV-1) and the like. Bacteria include Treponema pallidum and the like, and protozoa include toxoplasma and the like, but the detection target is not limited to these. In PCR, various pathogens can be detected by selecting a primer pair (forward and reverse) used for amplification of a target gene region.

It is considered that by mixing a sample such as anterior chamber fluid and vitreous with a PCR buffer containing a surfactant, the dissolution of the pathogen contained in the anterior chamber fluid and the vitreous is promoted during PCR. As the surfactant contained in the PCR buffer, an anionic surfactant, a cationic surfactant, an amphoteric surfactant or a nonionic surfactant can be selected. It is preferable to select a nonionic surfactant, preferably 0.05 to 5% (w/v) when mixed with a sample. In one embodiment of the present invention, the PCR buffer comprises KCl, $MgCl_2$ and dNTP mix (deoxyribonucleotide 5'-triphosphate; a mixture consisting of dATP, dGTP, dCTP and dTTP). The PCR buffer is preferably Tris-HCl, but is not limited thereto. Those skilled in the art can set appropriate concentrations for dNTP, $MgCl_2$, KCl, and buffer. For example, $MgCl_2$ is 1.5 mM, KCl is 35 mM, dNTP is 200 µM each, and Tris-HCl is 10 mM. In one embodiment of the present invention, the PCR buffer binds to substances which are biologically-derived negatively charged substance that adsorbs to DNA polymerase and biologically-derived a positively-charged substance that adsorbs to DNA, and inhibit PCR and contains a substance that neutralizes the PCR inhibitory effect of the negatively charged substance and the positively charged substance. As the PCR buffer, a gene amplification reagent Ampdirect (registered trademark, Shimadzu Corporation) or Ampdirect Plus (registered trademark, Shimadzu Corporation) can be used.

PCR can be initiated by directly adding a mixed solution of the sample and the PCR buffer to a solid composition for PCR reaction containing a DNA polymerase and one or more types of PCR primer pairs. The DNA polymerase is a thermostable DNA polymerase derived from a thermophilic bacterium, and Taq, Tth, KOD, Pfu and mutants thereof can be used, but are not limited thereto. A hot start DNA polymerase may be used to avoid non-specific amplification by the DNA polymerase. Examples of the hot start DNA polymerase include a DNA polymerase having an anti-DNA polymerase antibody bound thereto or a DNA polymerase having an enzyme active site chemically modified with a heat sensitive chemical, and a DNA polymerase having an anti-DNA polymerase antibody bound thereto is preferable.

In the method of the present invention, for simultaneously detecting a plurality of pathogenic microorganisms, a part of the mixed solution obtained in the step (1) is added simultaneously to a plurality of tubes containing a solid composition for PCR reaction containing one or more types of PCR primer pairs. In the step (1), a sample obtained from one patient is made into a mixed solution in one tube, and this mixed solution is added to a plurality of tubes containing a primer pair, and PCR is carried out to obtain a plurality of samples. Accordingly, a plurality of pathogenic microorganisms can be detected simultaneously. In the step (2), the mixed solution obtained in the step (1) is added to the tube containing the solid composition for PCR reaction, so that the solid composition for PCR reaction is dissolved, and PCR is advanced by performing thermal cycling. In one embodiment of the present invention, the tube strip connecting the plurality of tubes in the step (2) is a tube strip for 2 to 12 PCR. This tube strip can be directly subjected to real-time PCR.

In the step (2), as a PCR primer pair for detecting a pathogen, PCR primer pair for amplifying target gene region of herpes simplex virus type 1 (HSV-1) or type 2 (HSV-2), varicella zoster virus (VZV), Epstein-Barr virus (EBV)), Human herpesvirus type 6 (HHV-6), cytomegalovirus (CMV), human adult T-cell leukemia virus (HTLV-1), Treponema pallidum or toxoplasma can be used, but are not limited thereto. These PCR primer pairs can be added in combination of two kinds to the solid composition for PCR reaction contained in one well. Thereby, two types of pathogenic microorganisms can be detected in one well, so that the detection can be performed quickly.

Multiplex PCR has been proposed as a method for saving the amount of sample and amplifying multiple target genes at the same time (Sugita S, et al. Br J Ophthalmol. 2008; 92:928-932 and Sugita S, et al. Ophthalmology. 2013; 120:1761-1768). Multiplex PCR is a method of simultaneously amplifying a plurality of gene regions by using a plurality of PCR primer pairs in one PCR reaction system. This method has the advantage of being able to simultaneously detect a plurality of pathogenic microorganisms in addition to saving the amount of sample. However, it was necessary to extract the nucleic acid from the sample before carrying out PCR. Further, in the multiplex PCR, it is necessary to examine the setting of the primers to be used and the reaction conditions so that the amplification of the target gene region by each PCR primer pair proceeds well in one PCR reaction system.

As described above, when two types of PCR primer pairs are added to one well, cross-reactivity of the primers occurs, which makes accurate measurement difficult. In addition, accurate measurement may not be possible even when the amplification efficiency greatly differs between primer pairs. As a combination of primer pairs with excellent detection accuracy, (i) a glyceraldehyde-3-phosphate dehydrogenase (GAPDH) gene detection primer pair and a TATA-binding protein (TBP) gene detection primer pair are preferable. However, it is not limited to these. The GAPDH gene is a housekeeping gene that is commonly expressed in many tissues and cells in a certain amount, and is used as a positive control for confirming the progress of PCR. TBP is a basic transcription factor that binds to a DNA sequence called TATA box and reflects the number of cells, so it is used as a control for confirming that cells are collected and contained in a sample. As pathogenic microorganism detection primer pair, (ii) HSV-1 detection primer pair and VZV detection primer pair, (iii) HSV-2 detection primer pair and HHV-6 detection primer pair, (iv) EBV detection primer pair and CMV detection primer pair, and (v) HTLV-1 detection primer pair and Treponema pallidum detection primer pair are preferable. However, it is not limited to these. Further, in order to detect three types of pathogenic microorganisms at the same time, three or more types of PCR primer pairs may be added. Those skilled in the art can appropriately design the base sequence of each primer based on the base sequence information of the target gene.

The solid-state composition for PCR reaction in the step (2) contains an oligonucleotide probe labeled with one or more types of fluorescent dyes for fluorescent detection of PCR amplification products. When one type of PCR primer pair is added to the well in which PCR is performed, only one type of fluorescent dye is required for real-time determination, but when two types of PCR primer pair are added, two different fluorescent dyes are required. The fluorescent dye may be selected from the group consisting of FAM (6-carboxyfluorescein), ROX (6-carboxy-X-rhodamine), Cy5 (Cyanine dye) and HEX (4,7,2',4',5',7'-hexachlorofluor-6-carboxyfluorescein). However, other fluorescent dyes can also be used. Those skilled in the art can appropriately design the base sequence of the oligonucleotide probe based on the base sequence information of the PCR amplification product.

Those skilled in the art can easily set the PCR conditions (temperature, time, and the number of cycles). In one embodiment of the invention, PCR products are monitored by real-time determinations. Real-time determination of PCR products is also called real-time PCR. In real-time PCR, PCR amplification products are usually detected by fluorescence. The fluorescence detection method includes a method using an intercalating fluorescent dye and a method using a fluorescence-labeled probe. As the intercalating fluorescent dye, SYBR (registered trademark) Green I is used, but it is not limited thereto. The intercalating fluorescent dye binds to the double-stranded DNA synthesized by PCR and emits fluorescence upon irradiation with excitation light. By measuring this fluorescence intensity, the amount of PCR amplification product produced can be measured.

Fluorescently labeled probes include, but are not limited to, hydrolysis probes, molecular beacons, cycling probes and the like. The hydrolysis probe is an oligonucleotide modified at the 5' end with a fluorescent dye and at the 3' end with a quencher substance. The hydrolysis probe specifically hybridizes to the template DNA in the annealing step of PCR, but the presence of a quencher on the probe suppresses the generation of fluorescence even when irradiated with excitation light. In the subsequent extension reaction step, when the 5'→3' exonuclease activity of Taq DNA polymerase degrades the hydrolysis probe hybridized to the template DNA, the fluorescent dye is released from the probe, the suppression of the fluorescence generation by the quencher is released, and fluorescence is emitted. By measuring this fluorescence intensity, the amount of amplification product produced can be measured. Examples of the fluorescent dyes include FAM (6-carboxyfluorescein), ROX (6-carboxy-X-rhodamine), Cy5 (Cyanine dye) and HEX (4,7,2',4',5',7'-hexachloro-6-carboxyfluorescein) and the like, but are not limited thereto. Examples of the quencher include, but are not limited to, TAMRA (registered trademark), BHQ (Black Hole Quencher, registered trademark), MGB-Eclipse (registered trademark) and DABCYL. In order to detect two or more types of DNA target sequences separately, PCR is performed using two or more types of oligonucleotide probes (for example, hydrolysis probes) labeled with different fluorescent dyes.

In the real-time determination of the PCR product, the amplification curve of the PCR product is monitored using a fluorescent filter corresponding to the fluorescent dye used. When the fluorescence intensity increases according to the number of PCR cycles, the presence of the pathogen to be analyzed in the sample is determined to be positive, while when the fluorescence intensity does not increase in PCR, it is determined to be negative.

In one embodiment, the solid composition for PCR reaction in the step (2) is prepared by freeze-drying. However, it is not limited to freeze-drying as long as the activity of the enzyme contained in the solid composition for PCR reaction is maintained. With the solid composition, PCR can be started only by adding the mixed solution obtained in the step (1), so that the measurement operation becomes simple. In addition, storage before use becomes easy.

The present invention provides a kit for detecting a microorganism in a sample. The kit comprises tube 1 which contains a PCR buffer containing a surfactant for mixing the sample, and tube 2 which contains solid composition for PCR reaction which is a tube strip formed by connecting a plurality of tubes, and each tube contains DNA polymerase and one or more types of PCR primer pairs for adding a part of the mixed solution contained in tube 1.

The kit of the present invention is used to carry out the method for detecting a microorganism of the present invention. The tube 1 included in the kit contains a surfactant. As the surfactant, an anionic surfactant, a cationic surfactant, an amphoteric surfactant or a nonionic surfactant can be selected, preferably a nonionic surfactant added to the tube 1 so as to be 0.05-5% (w/v) when mixed with a sample. In one embodiment of the invention, tube 1 contains dNTP mix (deoxyribonucleotide 5'-triphosphate; a mixture of dATP, dGTP, dCTP and dTTP), $MgCl_2$, KCl and buffer. The buffer solution is preferably Tris-hydrochloric acid, but is not limited thereto. Those skilled in the art can add dNTP, $MgCl_2$, KCl and the buffer solution to the tube 1 so that they have appropriate concentrations during PCR. For example, at the time of PCR, $MgCl_2$ is added to the tube 1 such that the concentration is 1.5 mM, KCl is 35 mM, dNTP is 200 µM and tris-hydrochloric acid is 10 mM, respectively. In one embodiment of the present invention, the tube 1 contains substances that bind to substances which are a biologically-derived negatively-charged substance that adsorbs DNA polymerase (for example, certain sugars and dyes, or the like) and a biologically-derived positively-charged substance that adsorbs DNA (for example, certain protein, or the like) and inhibit PCR, and neutralize the PCR inhibitory effect of the negatively charged substance and the positively charged substance. In one embodiment of the present invention, a gene amplification reagent Ampdirect (registered trademark, Shimadzu Corporation) or Ampdirect Plus (registered trademark, Shimadzu Corporation) can be added to the tube 1.

The kit of the present invention includes a plurality of tubes 2 containing the solid composition for PCR reaction. In one embodiment, the tube 2 is 2-12 tube strip with connected wells. As the tube strip, a commercially available one can be used. Polypropylene or the like can be used as the tube material. The tube color is preferably uncolored or white. The solid composition for PCR reaction comprises a DNA polymerase and one or more types of PCR primer pairs. The DNA polymerase is a thermostable DNA polymerase derived from a thermophilic bacterium, and Taq, Tth, KOD, Pfu and mutants thereof can be used, but are not limited thereto. A hot start DNA polymerase may be used to avoid non-specific amplification by the DNA polymerase. Examples of the hot start DNA polymerase include a DNA polymerase having an anti-DNA polymerase antibody bound thereto or a DNA polymerase having an enzyme active site chemically modified with a heat sensitive chemical, and a DNA polymerase having an anti-DNA polymerase antibody bound thereto is preferable.

The tube 2 contains one or two PCR primer pairs for a pathogen. When adding two PCR primer pairs, for avoiding large differences in primer cross-reactivity and amplification efficiency, and for accurate measurement, as a combination of internal standards, (i) glyceraldehyde-3-phosphate dehydrogenase (GAPDH) gene detection primer pair and TATA-binding protein (TBP) gene detection primer pair are preferable; as pathogenic microorganism detection primer pair, (ii) HSV-1 detection primer pair and VZV detection primer pair, (iii) HSV-2 detection primer pair and HHV-6 detection primer pair, (iv) EBV detection primer pair and CMV detection primer pair, (v) HTLV-1 detection primer pair and Treponema pallidum detection primer pair are preferable. The combination of PCR primer pairs is not limited to these, and may be any combination as long as accurate measurement can be performed. Three or more types of PCR primer pairs may be added to the tube 2.

The tube 2 contains an oligonucleotide probe labeled with one or more types of fluorescent dyes for fluorescent detection of PCR amplification products. Usually, the number of fluorescent dyes added is the same as the number of PCR primer pairs added to the same tube. Fluorescent dyes can be selected from the group consisting of FAM (6-carboxyfluorescein), ROX (6-carboxy-X-rhodamine), Cy5 (Cyanine dye) and HEX (4,7,2',4',5',7'-hexachlorofluor-6-carboxyfluorescein). However, other fluorescent dyes may also be used.

In one embodiment, the solid composition for PCR reaction contained in the tube 2 can be prepared by lyophilization. The composition for PCR reaction containing all the components is added to the tube 2 and lyophilized by a general method to obtain a solid composition.

EXAMPLES

Next, the present invention will be described in detail with reference to examples. However, the scope of the present invention is not limited thereby.

Example 1

Analysis of 53 Infectious Uveitis-Positive Samples

20 µL of anterior chamber fluid or vitreous of samples obtained from 53 patients with suspected infectious uveitis were mixed with 180 µL of PCR buffer. The composition of the PCR buffer after mixing was 0.05% (w/v) nonionic surfactant, 1.5 mM $MgCl_2$, 35 mM KCl and 200 µM dNTP (dATP, dGTP, dCTP and dTTP), respectively. 20 µL of the obtained mixed solution was dispensed into each tube of an 8-strip tube strip containing the solid composition for PCR reaction. The solid composition for PCR reaction in the strip tube comprises a DNA polymerase, a fluorescent dye-labeled oligonucleotide probe for fluorescent detection of a PCR amplification product different in each tube, and one or two different PCR primer pairs. In addition, it contains one or two types of different PCR primer pairs. The combinations of PCR primer pairs were as follows.

(i) Glyceraldehyde-3-phosphate dehydrogenase (GAPDH) gene detection primer pair and TATA-binding protein (TBP) gene detection primer pair
(ii) HSV-1 detection primer pair and VZV detection primer pair
(iii) HSV-2 detection primer pair and HHV-6 detection primer pair
(iv) EBV detection primer pair and CMV detection primer pair
(v) HTLV-1 detection primer pair and Treponema pallidum detection primer pair
(vi) Toxoplasma detection primer pair.

As pathogen detection PCR primer pair, those having the following base sequences were used.

Besides, in the sequence notation R and M described in the present specification, R corresponds to a and g, and M corresponds to a and c, respectively.

```
GAPDH gene detection primer pair
                                       (SEQ ID NO: 1)
(Forward) 5'-tgtgctcccactcctgatttc-3'

(SEQ ID NO: 2)
(Reverse) 5'-cctagtcccagggctttgatt-3'

TBP gene detection primer pair
                                       (SEQ ID NO: 3)
(Forward) 5'-gcaccactccactgtatccc-3'

(SEQ ID NO: 4)
(Reverse) 5'-cccagaactctccgaagctg-3'

HSV-1 detection primer pair
                                       (SEQ ID NO: 5)
(Forward) 5'-cgcatcaagaccacctcctc-3'

(SEQ ID NO: 6)
(Reverse) 5'-gtcagctcgtgagttctg-3'
Target gene to be amplified: UL27

VZV detection primer pair
                                       (SEQ ID NO: 7)
(Forward) 5'-tcactaccagtcatttctatccatctg-3'

(SEQ ID NO: 8)
(Reverse) 5'-gaaaacccaaaccgttctcgag-3'
Target gene to be amplified: ORF29

HSV-2 detection primer pair
                                       (SEQ ID NO: 9)
(Forward) 5'-cgcatcaagaccacctcctc-3'
```

-continued (SEQ ID NO: 10)
(Reverse) 5'-gtcagctcgtgagttctg-3'
Target gene to be amplified: UL27

HHV-6 detection primer pair
(SEQ ID NO: 11)
(Forward) 5'-gaagcagcaatcgcaacaca-3'

(SEQ ID NO: 12)
(Reverse) 5'-acaacatgtaactcggtgtacggt-3'
Target gene to be amplified: U38

EBV detection primer pair
(SEQ ID NO: 13)
(Forward) 5'-ctgggcaaggagctgtttg-3'

(SEQ ID NO: 14)
(Reverse) 5'-ggccgcttgtaaaattgca-3'
Target gene to be amplified: BMRF1

CMV detection primer pair
(SEQ ID NO: 15)
(Forward) 5'-tcgcgcccgaagagg-3'

(SEQ ID NO: 16)
(Reverse) 5'-cggccggattgtggatt-3'
Target gene to be amplified: UL83

HTLV-1 detection primer pair
(SEQ ID NO: 17)
(Forward) 5'-ggccacctgtccagagca-3'

(SEQ ID NO: 18)
(Reverse) 5'-actgtagagctgagccgataacg-3'
Target gene to be amplified: Tax Treponema pallidum detection primer pair
(SEQ ID NO: 19)
(Forward) 5'-aggcatgttcgatgcagttt-3'

(SEQ ID NO: 20)
(Reverse) 5'-ttttcgcccaatacctcaac-3'
Target gene to be amplified: 47 kDa antigen gene Toxoplasma detection primer pair
(SEQ ID NO: 21)
(Forward) 5'-tcccctctgctggcgaaaagt-3'

(SEQ ID NO: 22)
(Reverse) 5'-agcgttcgtggtcaactatcgattg-3'
Target gene to be amplified: B1 gene As an oligonucleotide probe for detecting an amplification product by PCR, a 5' end labeled with a fluorescent dye FAM or ROX was used. All the oligonucleotide probes used had 3' ends modified with the quencher substance BHQ. The following nucleotide sequences were used for the probe.

GAPDH gene detection probe
(SEQ ID NO: 23)
5'-aaaagagctaggaaggacaggcaacttggc-3' (FAM label)

TBP gene detection probe
(SEQ ID NO: 24)
5'-acccccatcactcctgccacgc-3' (ROX label)

HSV-1 detection probe
(SEQ ID NO: 25)
5'-tggcaacgcggcccaac-3' (FAM label)

VZV detection probe
(SEQ ID NO: 26)
5'-tgtctttcacggaggcaaacacgt-3' (ROX label)

HSV-2 detection probe
(SEQ ID NO: 27)
5'-cggcgatgcgccccag-3' (FAM label)

HHV-6 detection probe
(SEQ ID NO: 28)
5'-aacccgtgcgccgctccc-3' (ROX label)

EBV detection probe
(SEQ ID NO: 29)
5'-ctcggctgtggagcaggcttcc-3' (FAM label)

CMV detection probe
(SEQ ID NO: 30)
5'-caccgacgaggattccgacaacg-3' (ROX label)

HTLV-1 detection probe
(SEQ ID NO: 31)
5'-actcacctgggacccatcgatgga-3' (FAM label)

Treponema pallidum detection probe
(SEQ ID NO: 32)
5'-ggcgcgttccgtcagcaatt-3' (ROX label)

Toxoplasma detection probe
(SEQ ID NO: 33)
5'-tctgtgcaactttggtgtattcgcag-3' (ROX label)

The 8-tube strip containing the solid composition for PCR reaction dissolved in the anterior chamber fluid or the PCR buffer mixed with the vitreous was monitored for the PCR reaction by the hydrolysis probe method using the real-time PCR device (such as Roche Diagnostics Cobas z480 device). As PCR conditions, initial denaturation was performed at 95° C. for 10 seconds, and then PCR was performed at 95° C. for 5 seconds –60° C. for 20 seconds for 45 cycles. The presence (positive) or absence (negative) of the target pathogenic microorganism was judged based on Cq values (the number of cycles at which the amplification curve crosses the threshold line). As a control, after the DNA was purified from each sample, the copy number was quantified by real-time PCR (qPCR) method.

The comparison results of the pathogen measured by the method of the present invention with real-time PCR (qPCR) method are shown in FIG. 1. Further, the correlation between the quantitative values by the real-time PCR (qPCR) method and the Cq values measured by the method of the present invention is shown in FIG. 2.

From the results of FIG. 1, all 53 positive samples that could be quantified by the real-time PCR (qPCR) method were positive even when measured by the method of the present invention. The results of FIG. 1 showed that HSV-1, HSV-2, VZV, EBV, CMV, HHV-6, HTLV-1, Treponema pallidum, and toxoplasma were identified. Further, the results of FIG. 2 showed that there was correlation between the quantitative values and the Cq values.

Example 2

Analysis of Samples Diagnosed as Non-Infectious Uveitis

FIG. 3 shows the results of 51 samples obtained from patients diagnosed with non-infectious uveitis measured by the real-time PCR (qPCR) method and the method of the present invention. All samples were negative by the real-time PCR (qPCR) method. They were also negative by the method of the present invention. That is, it was shown that the measurement results obtained by both methods match with each other.

Sequence Table

20190607 Sequence Table

The invention claimed is:

1. A method for detecting microorganisms in a sample, comprising
   (1) a step of mixing the sample with a PCR buffer comprising a nonionic surfactant; Tris buffer, containing KCl and $MgCl_2$; and a dNTP mix of dATP, dGTP, dCTP and dTTP to obtain a mixed solution;
   (2) a step of adding the mixed solution in step (1) to a plurality of tubes wherein each tube of the plurality of tubes comprises a solid composition for PCR reaction comprising a DNA polymerase and two types of PCR primer pairs which are selected from the group consisting of:
      (i) a Glyceraldehyde-3-phosphate dehydrogenase (GAPDH) gene detection primer pair having the sequences of SEQ ID NO:1 and 2 and a TATA-binding protein (TBP) gene detection primer pair having the sequences of SEQ ID NO:3 and 4,
      (ii) a HSV-1 detection primer pair having the sequences of SEQ ID NO: 5 and 6 and a VZV detection primer pair having the sequences of SEQ ID NO: 7 and 8,
      (iii) a HSV-2 detection primer pair having the sequences of SEQ ID NO: 9 and 10 and a HHV-6 detection primer pair having the sequences of SEQ ID NO: 11 and 12,
      (iv) a EBV detection primer pair having the sequences of SEQ ID NO: 13 and 14 and a CMV detection primer pair having the sequences of SEQ ID NO: 15 and 16, and
      (v) a HTLV-1 detection primer pair having the sequences of SEQ ID NO: 17 and 18 and a Treponema pallidum detection primer pair having the sequences of SEQ ID NO: 19 and 20 and a toxoplasma detection primer pair having the sequences of SEQ ID NO:21 and 22; and
   (3) a step of detecting the PCR product generated in each of the plurality of tubes;
   wherein the sample is anterior chamber fluid or vitreous.

2. The method according to claim 1, wherein the amount of the sample is 12-20 µL.

3. The method according to claim 1, wherein the microorganism is selected from the group consisting of herpes simplex virus type 1 (HSV-1) and type 2 (HSV-2), varicella zoster virus (VZV), Epstein-Barr virus (EBV), human herpesvirus type 6 (HHV-6), cytomegalovirus (CMV), human adult T-cell leukemia virus (HTLV-1), Treponema pallidum and toxoplasma.

4. The method according to claim 1, wherein in the step (2), the plurality of tubes comprises 2-12 tube strips.

5. The method according to claim 1, wherein in the step (2), the solid composition for PCR reaction contains an oligonucleotide probe labeled with one or more types of fluorescent dyes for fluorescent detection of PCR amplification products.

6. The method according to claim 5, wherein the fluorescent dyes are selected from the group consisting of FAM (6-carboxyfluorescein), ROX (6-carboxy-X-rhodamine), Cy5 (Cyanine dye) and HEX (4,7,2',4',5',7'-hexachlorofluor-6-carboxyfluorescein).

7. The method according to claim 1, wherein in the step (2), the solid composition for PCR reaction is in a lyophilized form.

8. The method according to claim 1, wherein in the step (3), the PCR products are detected by real-time determination.

* * * * *

```
                        SEQUENCE LISTING

<160> NUMBER OF SEQ ID NOS: 33

<210> SEQ ID NO 1
<211> LENGTH: 21
<212> TYPE: DNA
<213> ORGANISM: Artificial Sequence
<220> FEATURE:
<223> OTHER INFORMATION: GAPDH forward primer

<400> SEQUENCE: 1
tgtgctccca ctcctgattt c                                          21

<210> SEQ ID NO 2
<211> LENGTH: 21
<212> TYPE: DNA
<213> ORGANISM: Artificial Sequence
<220> FEATURE:
<223> OTHER INFORMATION: GAPDH Reverse Primer

<400> SEQUENCE: 2
cctagtccca gggctttgat t                                          21

<210> SEQ ID NO 3
<211> LENGTH: 20
<212> TYPE: DNA
<213> ORGANISM: Artificial Sequencw
<220> FEATURE:
<223> OTHER INFORMATION: TBP Forward Primer

<400> SEQUENCE: 3
gcaccactcc actgtatccc                                            20

<210> SEQ ID NO 4
<211> LENGTH: 20
<212> TYPE: DNA
<213> ORGANISM: Artificial Sequence
<220> FEATURE:
<223> OTHER INFORMATION: TBP Reverse Primer

<400> SEQUENCE: 4
cccagaactc tccgaagctg                                            20

<210> SEQ ID NO 5
<211> LENGTH: 20
<212> TYPE: DNA
<213> ORGANISM: Artificial Sequence
<220> FEATURE:
<223> OTHER INFORMATION: HSV-1 Forward Primer

<400> SEQUENCE: 5
cgcatcaaga ccacctcctc                                            20

<210> SEQ ID NO 6
<211> LENGTH: 18
<212> TYPE: DNA
<213> ORGANISM: Artificial Sequence
<220> FEATURE:
<223> OTHER INFORMATION: HSV-1 Reverse Primer

<400> SEQUENCE: 6
gtcagctcgt gagttctg                                              18
```

```
<210> SEQ ID NO 7
<211> LENGTH: 27
<212> TYPE: DNA
<213> ORGANISM: Artificial Sequence
<220> FEATURE:
<223> OTHER INFORMATION: VZV Forward Primer

<400> SEQUENCE: 7
tcactaccag tcatttctat ccatctg                                          27

<210> SEQ ID NO 8
<211> LENGTH: 22
<212> TYPE: DNA
<213> ORGANISM: Artificial Sequence
<220> FEATURE:
<223> OTHER INFORMATION: VZV Reverse Primer

<400> SEQUENCE: 8
gaaaacccaa accgttctcg ag                                               22

<210> SEQ ID NO 9
<211> LENGTH: 20
<212> TYPE: DNA
<213> ORGANISM: Artificial Sequence
<220> FEATURE:
<223> OTHER INFORMATION: HSV-2 Forward Primer

<400> SEQUENCE: 9
cgcatcaaga ccacctcctc                                                  20

<210> SEQ ID NO 10
<211> LENGTH: 18
<212> TYPE: DNA
<213> ORGANISM: Artificial Sequence
<220> FEATURE:
<223> OTHER INFORMATION: HSV-2 Reverse Primer

<400> SEQUENCE: 10
gtcagctcgt gagttctg                                                    18

<210> SEQ ID NO 11
<211> LENGTH: 20
<212> TYPE: DNA
<213> ORGANISM: Artificial Sequence
<220> FEATURE:
<223> OTHER INFORMATION: HHV-6 Forward Primer

<400> SEQUENCE: 11
gaagcagcaa tcgcaacaca                                                  20

<210> SEQ ID NO 12
<211> LENGTH: 24
<212> TYPE: DNA
<213> ORGANISM: Artificial Sequence
<220> FEATURE:
<223> OTHER INFORMATION: HHV-6 Reverse Primer

<400> SEQUENCE: 12
acaacatgta actcggtgta cggt                                             24

<210> SEQ ID NO 13
<211> LENGTH: 19
<212> TYPE: DNA
<213> ORGANISM: Artificial Sequence
<220> FEATURE:
<223> OTHER INFORMATION: EBV Forward Primer
```

```
<400> SEQUENCE: 13
ctgggcaagg agctgtttg                                                    19

<210> SEQ ID NO 14
<211> LENGTH: 19
<212> TYPE: DNA
<213> ORGANISM: Artificial Sequence
<220> FEATURE:
<223> OTHER INFORMATION: EBV Reverse Primer

<400> SEQUENCE: 14
ggccgcttgt aaaattgca                                                    19

<210> SEQ ID NO 15
<211> LENGTH: 15
<212> TYPE: DNA
<213> ORGANISM: Artificial Sequence
<220> FEATURE:
<223> OTHER INFORMATION: CMV Forward Primer

<400> SEQUENCE: 15
tcgcgcccga agagg                                                        15

<210> SEQ ID NO 16
<211> LENGTH: 17
<212> TYPE: DNA
<213> ORGANISM: Artificial Sequence
<220> FEATURE:
<223> OTHER INFORMATION: CMV Reverse Primer

<400> SEQUENCE: 16
cggccggatt gtggatt                                                      17

<210> SEQ ID NO 17
<211> LENGTH: 18
<212> TYPE: DNA
<213> ORGANISM: Artificial Sequence
<220> FEATURE:
<223> OTHER INFORMATION: HTLV-1 Forward Primer

<400> SEQUENCE: 17
ggccacctgt ccagagca                                                     18

<210> SEQ ID NO 18
<211> LENGTH: 23
<212> TYPE: DNA
<213> ORGANISM: Artificial Sequence
<220> FEATURE:
<223> OTHER INFORMATION: HTLV-1 Reverse Primer

<400> SEQUENCE: 18
actgtagagc tgagccgata acg                                               23

<210> SEQ ID NO 19
<211> LENGTH: 20
<212> TYPE: DNA
<213> ORGANISM: Artificial Sequence
<220> FEATURE:
<223> OTHER INFORMATION: Treponema pallidum Forward Primer

<400> SEQUENCE: 19
aggcatgttc gatgcagttt                                                   20

<210> SEQ ID NO 20
```

```
<211> LENGTH: 20
<212> TYPE: DNA
<213> ORGANISM: Artificial Sequence
<220> FEATURE:
<223> OTHER INFORMATION: Treponema pallidum Reverse Primer

<400> SEQUENCE: 20
ttttcgccca atacctcaac                                                  20

<210> SEQ ID NO 21
<211> LENGTH: 21
<212> TYPE: DNA
<213> ORGANISM: Artificial Sequence
<220> FEATURE:
<223> OTHER INFORMATION: Toxoplasma Forward Primer

<400> SEQUENCE: 21
tcccctctgc tggcgaaaag t                                                21

<210> SEQ ID NO 22
<211> LENGTH: 25
<212> TYPE: DNA
<213> ORGANISM: Artificial Sequence
<220> FEATURE:
<223> OTHER INFORMATION: Toxoplasma Reverse Primer

<400> SEQUENCE: 22
agcgttcgtg gtcaactatc gattg                                            25

<210> SEQ ID NO 23
<211> LENGTH: 30
<212> TYPE: DNA
<213> ORGANISM: Artificial Sequence
<220> FEATURE:
<223> OTHER INFORMATION: GAPDH detection probe

<400> SEQUENCE: 23
aaaagagcta ggaaggacag gcaacttggc                                       30

<210> SEQ ID NO 24
<211> LENGTH: 22
<212> TYPE: DNA
<213> ORGANISM: Artificial Sequence
<220> FEATURE:
<223> OTHER INFORMATION: TBP detection probe

<400> SEQUENCE: 24 accccccatca ctcctgccac gc                                              22

<210> SEQ ID NO 25
<211> LENGTH: 17
<212> TYPE: DNA
<213> ORGANISM: Artificial Sequence
<220> FEATURE:
<223> OTHER INFORMATION: HSV-1 detection probe

<400> SEQUENCE: 25
tggcaacgcg gcccaac                                                     17

<210> SEQ ID NO 26
<211> LENGTH: 24
<212> TYPE: DNA
<213> ORGANISM: Artificial Sequence
<220> FEATURE:
<223> OTHER INFORMATION: VZV detection probe

<400> SEQUENCE: 26
```
tgtctttcac ggaggcaaac acgt                                          24

<210> SEQ ID NO 27
<211> LENGTH: 16
<212> TYPE: DNA
<213> ORGANISM: Artificial Sequence
<220> FEATURE:
<223> OTHER INFORMATION: HSV-2 detection probe

<400> SEQUENCE: 27
cggcgatgcg ccccag                                                   16

<210> SEQ ID NO 28
<211> LENGTH: 18
<212> TYPE: DNA
<213> ORGANISM: Artificial Sequence
<220> FEATURE:
<223> OTHER INFORMATION: HHV-6 detection probe

<400> SEQUENCE: 28
aacccgtgcg ccgctccc                                                 18

<210> SEQ ID NO 29
<211> LENGTH: 22
<212> TYPE: DNA
<213> ORGANISM: Artificial Sequence
<220> FEATURE:
<223> OTHER INFORMATION: EBV detection probe

<400> SEQUENCE: 29
ctcggctgtg gagcaggctt cc                                            22

<210> SEQ ID NO 30
<211> LENGTH: 23
<212> TYPE: DNA
<213> ORGANISM: Artificial Sequence
<220> FEATURE:
<223> OTHER INFORMATION: CMV detection probe

<400> SEQUENCE: 30
caccgacgag gattccgaca acg                                           23

<210> SEQ ID NO 31
<211> LENGTH: 25
<212> TYPE: DNA
<213> ORGANISM: Artificial Sequence
<220> FEATURE:
<223> OTHER INFORMATION: HTLV-1 detection probe

<400> SEQUENCE: 31
actcacctgg gaccccatcg atgga                                         25

<210> SEQ ID NO 32
<211> LENGTH: 20
<212> TYPE: DNA
<213> ORGANISM: Artificial Sequence
<220> FEATURE:
<223> OTHER INFORMATION: Treponema pallidum detection probe

<400> SEQUENCE: 32
ggcgcgttcc gtcagcaatt                                               20

<210> SEQ ID NO 33
<211> LENGTH: 26
<212> TYPE: DNA

```
<213> ORGANISM: Artificial Sequence
<220> FEATURE:
<223> OTHER INFORMATION: Toxoplasma detection probe

<400> SEQUENCE: 33
tctgtgcaac tttggtgtat tcgcag                                              26
```